Jan. 26, 1965  R. B. COTTON  3,167,303
AERIAL PICK-UP SYSTEM

Filed March 12, 1963  4 Sheets-Sheet 1

INVENTOR
Robert B. Cotton
BY
*Herbert M. Birch*
ATTORNEY

Jan. 26, 1965  R. B. COTTON  3,167,303
AERIAL PICK-UP SYSTEM

Filed March 12, 1963  4 Sheets-Sheet 2

INVENTOR
Robert B. Cotton
BY *Herbert M. Birch*
ATTORNEY

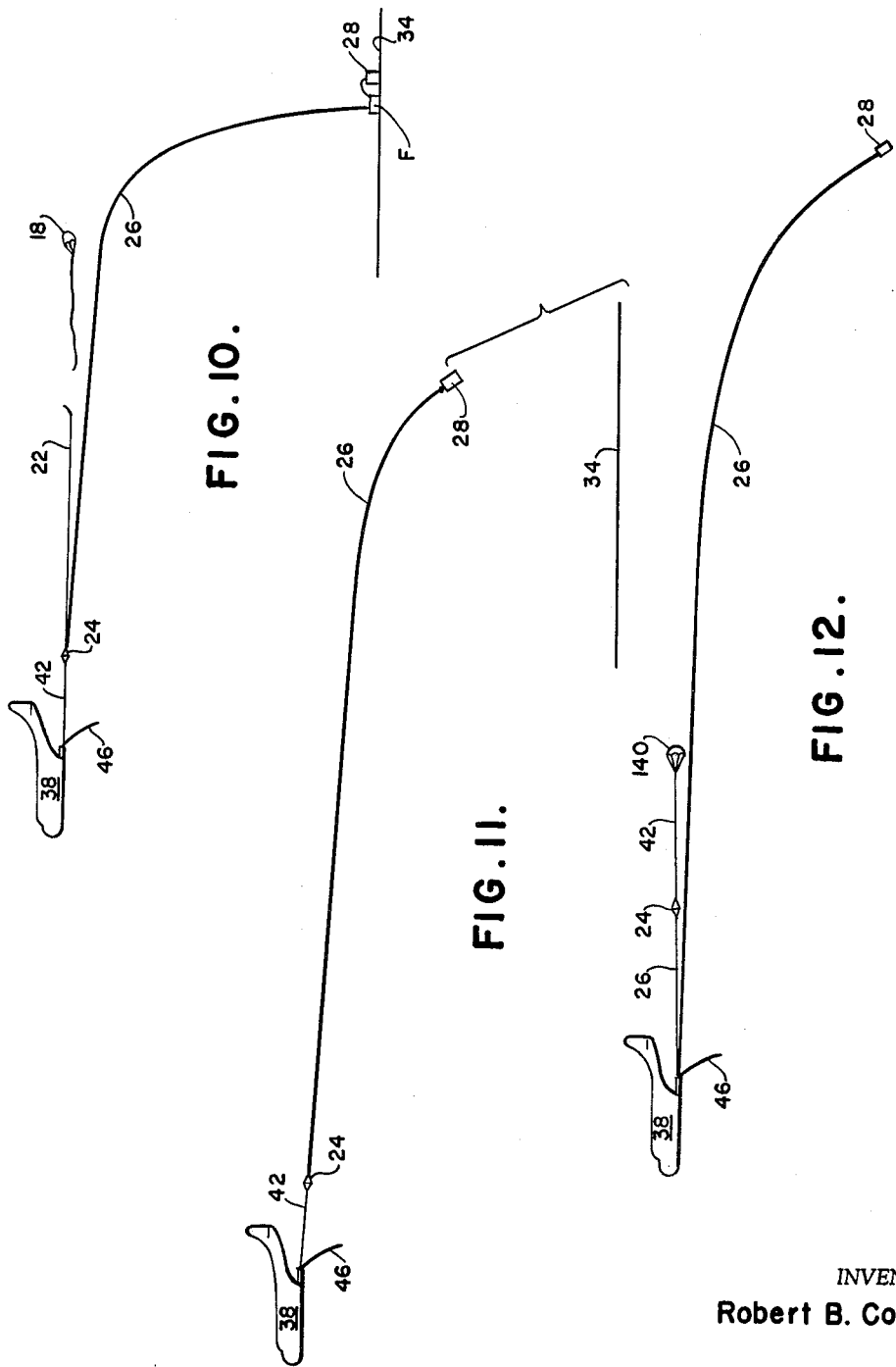

Jan. 26, 1965  R. B. COTTON  3,167,303
AERIAL PICK-UP SYSTEM
Filed March 12, 1963  4 Sheets-Sheet 4
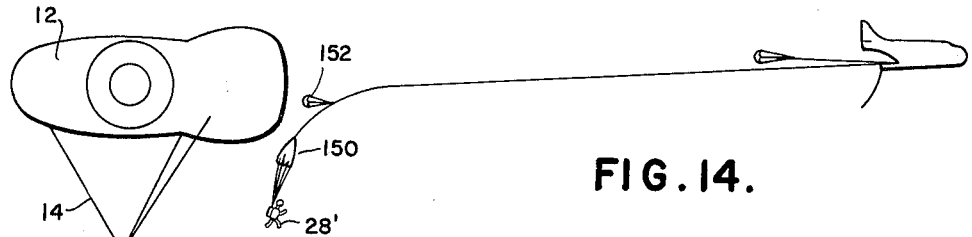
FIG.14.
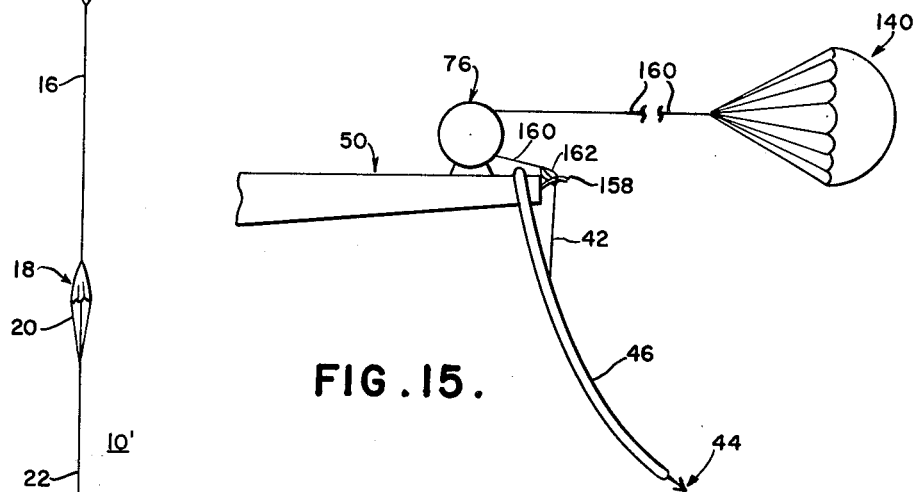
FIG.15.
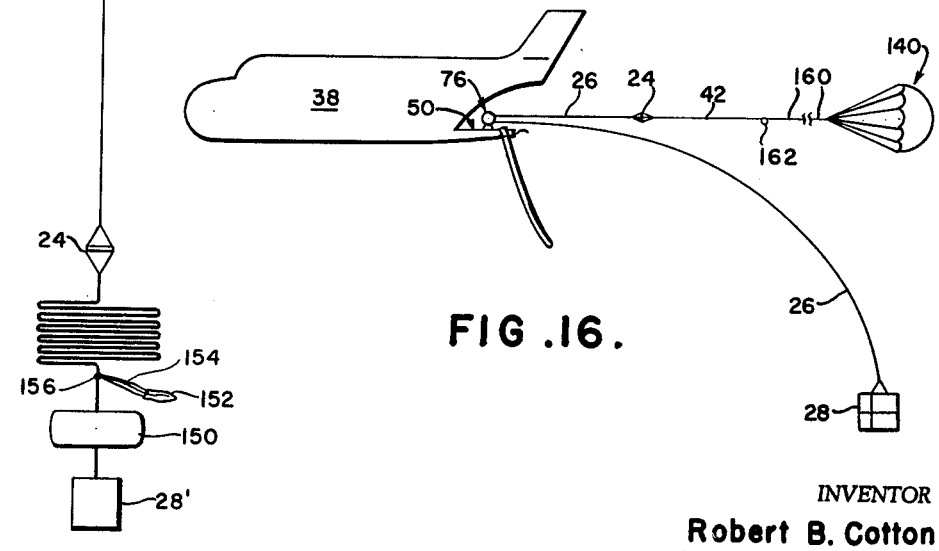
FIG.16.
FIG.13.
INVENTOR
Robert B. Cotton
BY  *Herbert M Birch*
ATTORNEY United States Patent Office 3,167,303
Patented Jan. 26, 1965

3,167,303
AERIAL PICK-UP SYSTEM
Robert B. Cotton, Media, Pa., assignor to All American Engineering Company, Wilmington, Del., a corporation of Delaware
Filed Mar. 12, 1963, Ser. No. 264,611
39 Claims. (Cl. 258—1.2)

This invention relates to aerial pick-up systems and more particularly to pick-up systems wherein an aircraft can pick up cargo or the like from a surface station while the said aircraft is maintaining altitude and airspeed.

It is an object of this invention to provide an aerial pick-up system having light-weight ground equipment which can be easily handled by a single operator.

It is another object of this invention to provide an aerial pick-up system wherein the aircraft may be at altitudes of up to two hundred and fifty feet or more above the surface station from which the cargo is to be picked up.

Another object of this invention is to provide an aerial pick-up system wherein the kinetic energy of the aircraft is used to provide the energy required to effectuate the pick-up.

Another object of this invention is to provide an aerial pick-up system wherein an auxiliary pick-up line suspended from an airborne target means is utilized to accelerate a main pick-up line, attached at one end to the cargo, to the aircraft and the main pick-up line is subsequently used to deliver the cargo into the aircraft.

Still another object of this invention is to provide an aerial pick-up system wherein an auxiliary pick-up line suspended from an airborne target means is utilized to accelerate a main pick-up line, attached at one end to the cargo, to the aircraft and the main pick-up line is subsequently used to deliver the cargo into the aircraft; and wherein a first drag parachute is utilized to accelerate said auxiliary and main pick-up lines to said aircraft and a second drag parachute is utilized to accelerate said cargo to said aircraft.

Still another object of this invention is to provide an aerial pick-up system including an aircraft and a novel drag parachute and capstan means in said aircraft.

Still another object of this invention is to provide an aerial pick-up system including an aircraft and a novel drag parachute and capstan means in said aircraft, wherein said drag parachute and capstan means are energized by the kinetic energy of said aircraft.

Still another object of this invention is to provide an aerial pick-up system including an aircraft and a novel drag parachute and capstan means in said aircraft; and novel control means on said drag parachute and capstan means to obtain variable reel-in speed of a cargo as it approaches the aircraft.

Yet another object of this invention is to provide an aerial pick-up system for human cargo wherein optimum safety conditions are provided.

Yet another object of this invention is to provide an aerial pick-up system wherein the equipment used is simple, light in weight and inexpensive.

Still another object of this invention is to provide an aerial pick-up system including an aircraft and ground equipment wherein the means of making contact with the ground equipment by the aircraft provides optimum reliability and safety under all conditions of operation of the aircraft.

Still another object of this invention is to provide an aerial pick-up system, wherein means is provided in the aircraft for achieving extremely fast reel-in speeds for the cargo being picked-up with no power requirements from the internal systems of the aircraft.

These and other objects of this invention will become more fully apparent with reference to the following specification and drawings which relate to several preferred embodiments of the invention.

In the drawings:

FIGURE 10 is a schematic of the invention in a stage in the pick-up cycle subsequent to FIGURE 9;

FIGURE 11 is a schematic of the invention in a stage in the pick-up cycle subsequent to FIGURE 10;

FIGURE 12 is a schematic of the invention in a stage in the pick-up cycle subsequent to FIGURE 11;

FIGURE 13 is a schematic of another embodiment of the ground station equipment of the invention;

FIGURE 14 is a schematic of the embodiment of FIGURE 13 in a final stage of the pick-up cycle;

FIGURE 15 is a partial schematic of a system for picking up heavy cargo; and

FIGURE 16 is an operational schematic of the heavy cargo system of FIGURE 15.

Figure 1:
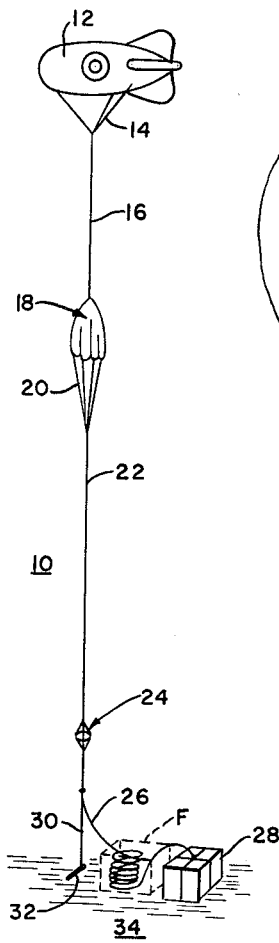
FIGURE 1 is a perspective of the assembled surface station equipment of the invention.

Referring in detail to the drawings, and more particularly to FIGURE 1, the ground station 10 is shown as including an airborne balloon target 12 tethered via an integral bridle 14 and leader 16 to the apex of a first drag parachute 18, hereinafter described as the pilot drag chute 18. The said pilot chute 18 is tethered via its shroud lines 20 to one end of a pilot pick-up line 22, the other end of the pilot line 22 being connected to a coupling ring assembly 24 which joins the pilot line 22 to one end of a main pick-up line 26. The other end of the main pick-up line 26 is connected with a cargo 28 which is to be picked up by the system of the present invention. A frangible link 30 or the like is connected between the main line 26 adjacent the coupling ring 24 and a land anchor 32 whereby the balloon target 12 is tethered to the ground 34.

The main pick-up line may be contained on the ground in a faking box F, as shown in dotted lines in FIGURE 1.

Figure 2:
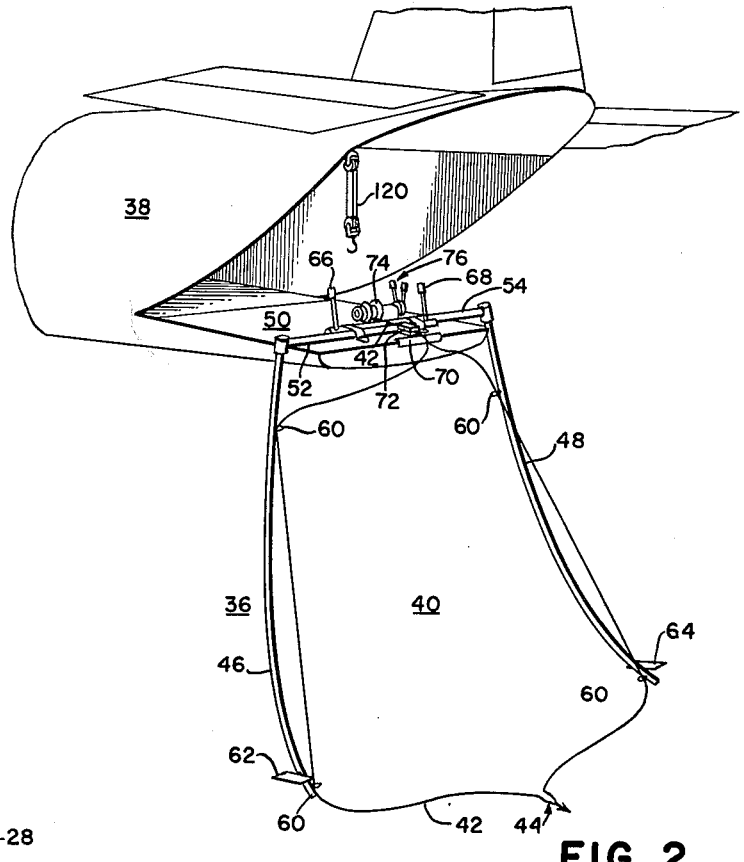
FIGURE 2 is a perspective of the airborne equipment of the invention.

Referring now to FIGURE 2, the airborne equipment 36 in the aircraft 38 will now be described.

A dependent pick-up loop 40 is effected by a closed loop of line 42 having a centrally located ring-hook assembly 44 in the lowermost portion thereof. The loop 40 is kept in open position by means of a pair of dependent parallel pick-up poles 46 and 48 which are mounted on the cargo platform 50 of the aircraft 38 by means of cylindrical pole mounts 52 and 54, respectively. The pole mounts 52 and 54 are at right angles to the respective pick-up poles 46 and 48 and are rotatably mounted in cylindrical housings 56 and 58 which are horizontally and transversely fixed on the cargo platform 50 of the aircraft 38. The pick-up poles have a plurality of spring clips 60 distributed along their respective lengths in which the line 42 forming the pick-up loop 40 is retained. The line 42 is composed of a material whereby the said line 42 is flexible but resists kinking as will be hereinafter more fully described.

The pick-up poles 46 and 48 are respectively provided adjacent their outermost tips with drag plates 62 and 64 which balance the drag load, caused by the airstream in which the said poles are positioned, to maintain the poles in the lowered position shown in FIGURE 2. Manual positioning means for the poles 46 and 48 such as the handles 66 and 68, respectively, on the pole mounts 52 and 54 are provided.

The loop line 42 extends from the upper end of the loop over a buffer or guide roller 60 on the rear edge of the cargo platform 50 and thence through a one-way safety wedge 72 to the capstan or main drum 74 of a capstan assembly 76 which is mounted on the cargo platform 50 of the aircraft 38. Several turns of the loop line 42 are made around the capstan 74 for a purpose to be hereinafter described.

Figure 3:
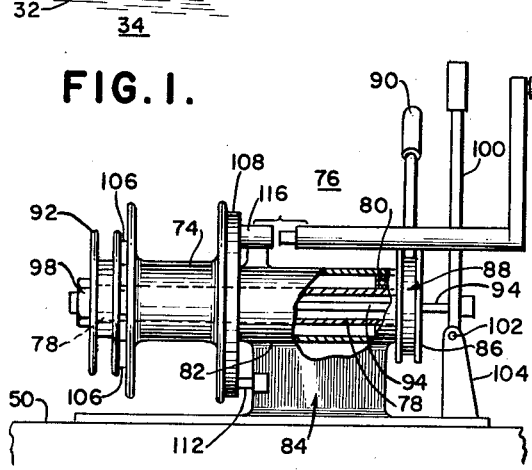
FIGURE 3 is an enlarged front elevation of the capstan assembly shown in FIGURE 2.
Figure 4:
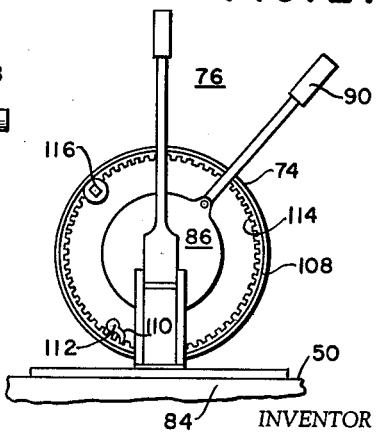
FIGURE 4 is a side elevation of the capstan assembly of FIGURE 3.

Referring now to FIGURES 3 and 4, the capstan assembly 76 will now be described in more detail.

The capstan 74 is keyed to a hollow central shaft 78 in the capstan assembly 76, the shaft 78 being journalled for rotation in bearing means 80 mounted in a concentric housing 82. The housing 82 is integral with a fixed base means 84 which is bolted or otherwise suitably affixed to the cargo platform 50.

Adjacent the opposite end of the shaft 78 from the capstan 74, a brake housing 86 is mounted on the shaft housing 82 which houses any suitable friction brake means 88 for applying a selective braking action to the shaft 78. An operating brake handle 90 is provided to actuate the friction brake means 88.

At the opposite end of the shaft 78, adjacent the capstan 74, an auxiliary or control line drum 92 is mounted for both sliding movement and free rotation on the said shaft 78. A drag link 94 is connected from a telescoping enlarged end cap 98 on the tip of the shaft 78, juxtaposed with the outer face of the control line drum 92, through the interior of the shaft 78 to the other end thereof where it is connected intermediate the ends of an operating lever 100. The lever 100 is pivoted at one end by a pivot means 102 on a fixed stanchion 104 or the like on the base means 84 of the capstan assembly 76. The control handle 100 is pivoted on the pivot means 102 such that movement of the handle 100 is effected longitudinally of the shaft 78.

A plurality of friction brake pads or discs 106 are mounted integral with the inner end face of the control-line drum and are adapted to be selectively engaged with the adjacent end face of the capstan 74 as will be hereinafter more fully described.

On the opposite end face of the capstan 74, a ring gear 108 is integrally and symmetrically mounted. A pawl means 110 mounted on a rocker arm 112 which is in turn mounted on the base means 84 is provided to selectively prevent turning of the capstan by engaging the teeth 114 of the ring gear 108.

A spur gear rewind means 116 is generally shown which cooperates with a rewind handle 118 and the teeth 114 of the ring gear 108 to provide a manual rewind means for the capstan assembly 76.

Referring back to FIGURE 2, a block and tackle assembly 120 is provided in the aircraft 38 adjacent the capstan assembly 76, whereby the cargo 28 may be finally brought aboard after being picked-up and brought to a position immediately adjacent the rear end of the cargo platform 50.

Figures 5, 6:
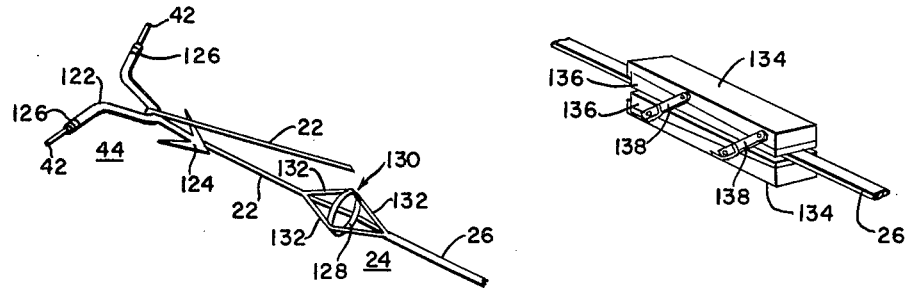
FIGURE 5 is an enlarged detail in perspective of the ring hook assembly shown in FIGURE 2.
FIGURE 6 is an enlarged detail in perspective of the safety wedge assembly shown in FIGURE 2.

Referring now to FIGURE 5, the ring hook assembly 44 is shown in more detail as comprising a V-tube 122 having an arrow-shaped, spring-like, grapple means 124 extending from the apex thereof. The V-tube 122 is connected with the loop line 42 by passing the line 42 through the tube and bonding it to the tube ends 126. The V-tube 122 is coated with Teflon or other synthetic which has a low coefficient of surface friction.

As shown, the pilot line 22 is reeved around the V-tube 122 at the apex thereof. This causes the coupling ring assembly 24 to approach the spring grapple means 124 during the pick-up cycle.

The coupling ring assembly 24 comprises a metal ring 128 confined in a basket or sheath 130 defined by a plurality of longitudinally disposed line sections 132 which engage the ring 126 at spaced points on its periphery to keep the plane of the ring 126 perpendicular to the pilot and main pick-up lines 22 and 26, respectively.

As shown in FIGURE 6, the preferred embodiment of the main pick-up line 26, as well as all of the other lines not shown, is in the form of a flat synthetic tape such as that commonly fabricated from nylon.

The safety wedge 72 is shown as comprising two rectangular keeper blocks 134 having inner planar surfaces conformally shaped to receive two wedge-shaped brake shoes 136 therebetween which are arranged to increase the drag exerted thereby on the main pick-up line 26 if it tends to move from left to right as shown. This direction is respresentative of that which would take the cargo 28 away from the aircraft 38 and thus the safety-wedge 72 prevents reel-out of the cargo 28, the loop line 42, pilot line 22 or main pick-up line 26 from the capstan 74. Spring biased parallel links 138 are provided to span the keeper blocks 134 and maintain a predetermined pressure on the wedge-shaped shoes 136.

Figure 7:
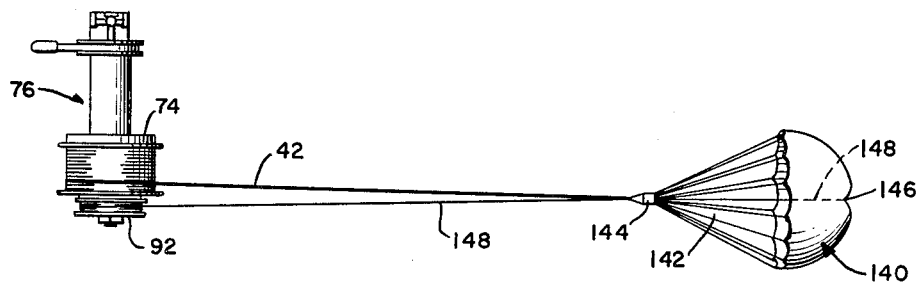
FIGURE 7 is a schematic representation of a drag chute and a drag control means for the said chute.
Figures 8, 9:
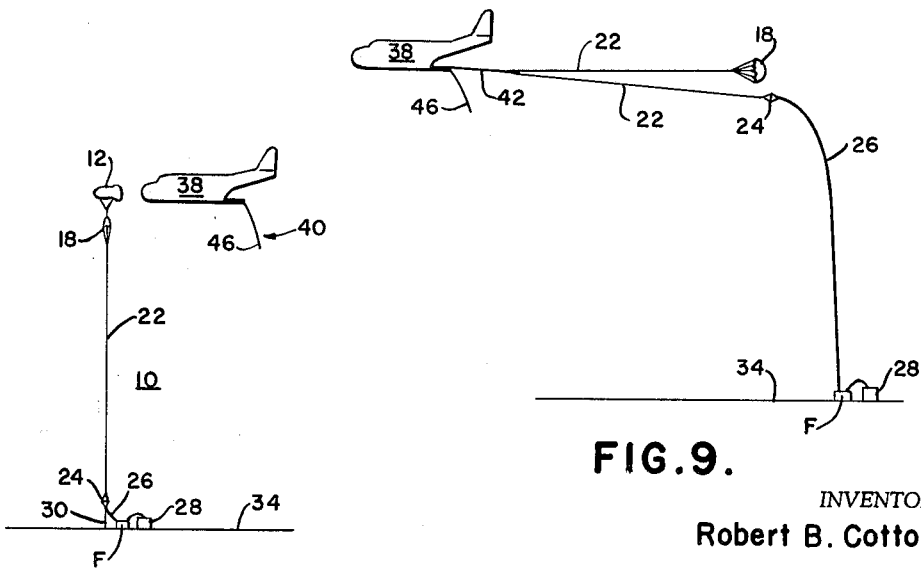
FIGURE 8 is a schematic of the invention immediately prior to the initiation of a pick-up cycle.
FIGURE 9 is a schematic of the invention in a stage in the pick-up cycle subsequent to that of FIGURE 8.

Referring now to FIGURE 7, a second drag parachute 140, hereinafter described as the main drag chute 140, is shown which is connected by its shroud lines 142 and a terminal or coupling ring 144 to the loop line 42, the loop line 42 being wound on the capstan 74.

The apex 146 of main drag chute 140 is connected with one end of a drag control line 148 which extends through the terminal ring 144 on the said chute 140 to the control line drum 92 of the capstan assembly 76 where it is wound on the said drum 92.

Referring now to FIGURE 13, another embodiment of a ground station 10' is shown as including, in addition to all of the elements of the ground station 10 of FIGURE 1, a personnel parachute 150 connected with a human cargo 28' by its conventional harness and shroud lines not shown, and connected by its apex, not shown, to the end of the main pick-up line 26. A lift parachute 152 is tethered in open condition to the main pick-up line 26 via its shroud lines 154 and a tethering means 156 located adjacent the apex of the personnel parachute 150.

*Heavy cargo pick-up*

For heavy cargo loads at the ground station 10, such as loads weighing more than four hundred pounds, the inherent energy absorbtion characteristics of the main pick-up line 26 is insufficient to properly compensate for the high transient loads incurred during initial acceleration of the cargo 28 from the ground station 10 toward the aircraft 38. Thus, some additional means must be provided for absorbing the said transient loads.

Referring to FIGURE 15, one preferred embodiment of such an energy absorber will now be described.

A retaining hook 158 is integrally connected to the rear edge of the cargo deck or ramp 50 of the aircraft 38.

The main drag parachute 140 is connected to one end of a suitable tow line 160 which is reeved on the capstan assembly 76 and terminates at its other end in an integral retaining ring 162 which is engaged with the retaining hook 158 on the load deck 50. The drag of the main drag chute 140 tensions the tow line 160 and causes the said retaining ring 162 to remain securely on the said retaining hook 158.

The retaining ring 162 is further connected into the pick-up system on the aircraft 38 by attaching the upper end of the pick-up loop 42 thereto. The retaining ring may be of either a rigid ring or resilient loop construction as long as its strength is sufficient.

Operation

Referring now to FIGURES 8, 9, 10, 11 and 12, the operation of the invention will now be described.

The first step in initiating a pick-up cycle, once the ground station 10 has been erected to place the airborne target balloon 12 in the air, is to fly the aircraft 38 directly into the balloon 12 such that the nose of the said aircraft 38 will burst the balloon 12.

The pick-up loop 40 is suspended at a sufficient distance below the aircraft 38, via the poles 46 and 48, so that the pilot drag chute 18 will pass through the loop 40, and, as shown in FIGURE 5, the pilot line 22 will reeve around the V-tube 122 of the ring-hook assembly 44. The reason for the anti-kinking characteristics of the loop line 42 will now become apparent. If the pilot line 22 engages the loop 40 off-center such that there is line-to-line engagement between the loop line 42 and the said pilot line 22, the loop line 42 must be of sufficient stiffness to serve as a guide for the pilot line 22. Thus, the pilot line 22 will always eventually end up reeved around the V-tube 122 of the ring-hook assembly 44. If the loop line 42 should kink and grab the pilot line 22 the system would not function properly.

The pilot drag chute 18 now opens and applies a drag load on the pilot line 22 which is sufficient to accelerate the main pick-up line 26 toward the aircraft 38 as the pilot drag chute 18 accelerates away from the said aircraft 38.

The drag load generated causes the pick-up loop 40 to be disengaged from the pick-up poles 46 and 48 by forcing the loop line 42 out of engagement with the spring clips 60 on the said pick-up poles.

After the pilot line 22 has substantially passed through the ring-hook assembly 44, the coupling ring 128, see FIGURE 5, of the coupling ring assembly 24 is caused to be impaled upon the spring grapple means 124 of the ring-hook assembly 44. Since the grapple means 124 is arrow-shaped, the ring 128 cannot back off of the said grapple. Also, because of the dimensions of the V-tube 122, the ring 128 cannot proceed forward on the ring-hook assembly 44 thus stopping the acceleration of the pilot line 22, by means of the pilot drag chute 18.

The pilot line 22 is very light in weight and strength compared to the main pick-up line 26 so that a small balloon target 12 is sufficient to maintain it above the ground 34. Its strength is only sufficient to lift and accelerate the main pick-up line 26 to the aircraft 38.

Thus, the load on the pilot line 22 caused by the pilot drag chute 18 is suddenly increased above the maximum permissible load for the said pilot line 22 and the pilot line 22 is caused to rupture as shown in FIGURE 10. However, the main pick-up line 26 is now connected with the loop-line 42 via the ring hook assembly 44 and the coupling ring assembly 24 and once the main line 26 is fully tensioned by the aircraft 38, the cargo will be accelerated from the ground 34 and trail behind the aircraft 38 as shown in FIGURE 11. By using a synthetic pick-up line, the resilient properties of the line and the drag thereon during a pick-up cycle are sufficient to insure a smooth safe acceleration rate of the cargo 28 toward the aircraft 38.

At this point the ring 128 is seated on the grapple means 124 by the drag load on the main pick-up line 26. Once the cargo 28 is trailing the aircraft 38 at the same speed as the said aircraft, the main drag chute 140, which is connected to the loop line 42 after it has been reeved around the capstan 74 for several turns, is released from the aircraft 38 and permitted to trail behind as generally shown in FIGURE 12.

Since the friction brake 88 is engaged with the capstan shaft 78 and the locking pawl 110 is engaged with the teeth 114 of the ring gear 108, the capstan is prevented from turning under the torque generated by the drag of the main drag chute 140.

Now, the friction brake 88 is relieved slightly and the locking pawl 110 is disengaged to permit the capstan 74 to turn and bring the V-tube 122, grapple means 124 and coupling ring 128 up to the safety wedge 72. The safety wedge 72 is then opened to permit this ring-hook assembly 44 and coupling ring 128 to pass through, after which the wedge 72 is reclosed on the main pick-up line 26 and the said ring-hook assembly is permitted, by regulation of the friction brake 88 to pass around the capstan 74 and back out of the aircraft 38 under the pull of the main drag chute 140.

The friction brake 88 is now disengaged to permit the main drag chute 140, capstan 74 and the main pick-up line 26 to reel-in the cargo 28 to the aircraft 38 at a high rate of speed.

The reel-in speed is controlled by the drag-control line 148 between the control line drum 92 on the capstan assembly 76 and the apex 146 of the main drag chute 140.

As shown in FIGURES 3 and 7, the control line drum 92 is of a smaller effective diameter than the capstan 74, whereby the control line 148 causes the control drum 92 to turn at a higher r.p.m. than the capstan 74 as it is payed-out with the main drag chute 140. Thus, there is relative motion between the capstan 74 and the control drum 92.

Therefore, by applying the proper pressure to the brake lever 100 the control drum 92 and the friction pads 106 thereon will be forced, via the drag link 94, into engagement with the capstan 74. Thus, the reel-out rate of the drag control line 148 may be varied from the reel-out speed of the main drag chute 140 downward and the said chute 140 may be selectively spilled to vary the drag generated thereby and hence, the reel-out speed thereof.

The reel-out continues until the cargo 28 is in a position where the block and tackle 120 may be connected therewith to load it into the aircraft 38 and complete the pick-up cycle.

The main pick-up line 26, loop line 42 and main drag chute 140 are now in tow behind the aircraft 38. This assembly may be expended in the interest of speed or in the alternative, the control line 148 may be used to completely spill the main drag chute 140 and the manual reel-in handle 118, spur gear assembly 116 and ring gear 108 may be employed to retrieve it. Power rewind means may, of course, also be employed.

With reference to the embodiment of FIGURE 13, the pick-up cycle operation is the same as that shown in FIGURES 8, 9, 10, 11 and 12 except for the presence and function of the lift parachute 152.

As shown in FIGURE 14, when the cargo 28' is accelerated by the main pick-up line 26, the lift chute creates a drag force which assures a rapid vertical rise of the human cargo 28', whereby in rough or overgrown terrain the chance of injury is minimized.

Referring now to FIGURES 15 and 16, the operation of the heavy cargo embodiment of the invention will now be described.

The main drag chute 140 is payed-out from the capstan assembly 76 and held at a fixed distance behind the aircraft 38 via the tow line 160 and the retaining ring 162 on the integral retaining hook 158. The pilot line 22 is then engaged by the ring-hook assembly 44 and the coupling ring 24 on the main line 26 is subsequently engaged as hereinbefore described.

However, when the slack has been taken-up in the main line 26, the inertia mass of the heavy cargo 28 acts to pull the retaining ring 162 off the retaining hook 158 and suddenly subject the main drag chute 140 to the full cargo load including the said inertia of the cargo 28.

Thus, the transient loading causes the main drag chute 140 to come towards the aircraft 38 until the energy of inertia of the cargo 28 has been fully absorbed, at which point the main drag chute 140 reverses its direction and accelerates the cargo 28 towards the aircraft 38.

The reel-in speed may then be controlled as hereinbefore described.

As can be seen from the foregoing specification and drawings, this invention provides a new and novel aerial pick-up system which is light in weight and foolproof in operation and which satisfies a long felt need in the aerial pick-up art for a system which permits the flying of an aircraft at normal altitudes and speeds during the pick-up cycle. All of the energy required to accelerate the pilot line, pick-up line and cargo toward the aircraft is derived from the kinetic energy of the aircraft by means of drag parachutes.

It is to be understood that the embodiments of this invention shown and described herein are for the sake of example only and are not intended to limit the scope of the appended claims.

What is claimed is:

1. An aerial pick-up system comprising an aircraft, a surface station, first pick-up means on said aircraft, a cargo at said surface station to be delivered to said aircraft via said first pick-up means while said aircraft is maintaining normal altitude and airspeed and second pick-up means at said surface station engageable by said first pick-up means, including a pick-up line connected at one end to said cargo, a pilot line connected at one end to the other end of said pick-up line, an airborne target means and a drag parachute, said airborne target means being tethered to the other end of said pilot line by means of said drag parachute.

2. The invention defined in claim 1, wherein said pilot line is of substantially lesser strength and weight than said pick-up line and wherein both said pilot line and said pick-up line are composed of resilient synthetic fibers.

3. The invention defined in claim 1, wherein said first pick-up means further includes a pick-up loop dependent from said aircraft having line quide means for said pilot line and a first coupling means on said line quide means and wherein said second pick-up means further includes a second coupling means interconnecting said pilot line and said pick-up line adapted to interconnect with said first coupling means when said pick-up line has been accelerated into juxtaposition with said line guide means by said pilot line.

4. The invention defined in claim 3, wherein said line guide means comprises a V-shaped tubular member integral with said pick-up loop and adapted to receive said pilot line within the apex thereof; wherein said first coupling means comprises an integral extension of the apex of said V-shaped member having one-way engaging means thereon; and wherein said second coupling means includes an in-line coupling element at the juncture of said pilot line and said pick-up line adapted to interlock with said one-way engaging means.

5. In an aerial pick-up system including an aircraft, pick-up means on said aircraft, a surface station and a cargo at said surface station to be picked up by said aircraft, the combination at said surface station of an airborne target means, drag means suspended below said target means, a pilot line tethering said drag means and target means to said surface station, and a pick-up line interconnecting said pilot line and said cargo, said pilot line and said drag means cooperating with said pick-up means to accelerate said pick-up line toward said aircraft.

6. The invention defined in claim 5, wherein said pilot line is of substantially lesser strength and weight than said pick-up line and wherein both said pilot line and said pick-up line are composed of resilient synthetic fibers.

7. The invention defined in claim 5, wherein said drag means comprises a parachute having a canopy and shroud lines, said canopy being connected at its apex with said target means and said shroud lines being connected with said pilot line.

8. Means for accelerating an initially fixed surface body to a moving airborne body utilizing the kinetic energy of said airborne body comprising tow means connected with said surface body of sufficient strength and weight to withstand acceleration loads on said surface body, airborne pilot means connected with said tow means and extending into the path of said airborne body and being of sufficient strength and weight to withstand acceleration loads on said tow means, said pilot means including drag means integral therewith adjacent said airborne body and means on said airborne body adapted to engage said pilot means adjacent to said drag means.

9. An aerial pick-up system comprising an aircraft, a surface station, a cargo at said surface station to be picked up and delivered to said aircraft while said aircraft is maintaining normal altitude and air speed, first pick-up means on said aircraft including a dependent pick-up loop, capstan means and first drag means, said pick-up loop including an integral extension reeved around said capstan means and connected with said first drag means; and second pick-up means at said surface station comprising an airborne target means tethered to said surface station, a pick-up line connected with said cargo, a pilot line connected with said pick-up line and second drag means interconnecting said pilot line and said target means, said pilot line being tethered to said surface station to constrain said target means and said drag means thereabove and being adapted to be engaged by said pick-up loop adjacent said second drag means.

10. The invention defined in claim 9, wherein said first and second drag means comprise first and second parachute means, respectively, said first drag means being of sufficient size to accelerate said pick-up line and said cargo toward said aircraft and said second drag means being of sufficient size to accelerate said pick-up line and said pilot line toward said aircraft.

11. The invention defined in claim 9, wherein said pilot line is of substantially lesser strength and weight than said pick-up line and wherein both said pilot line and said pick-up line are composed of resilient synthetic fibers.

12. The invention defined in claim 9, wherein said capstan means further includes selective drag control means for said first drag means.

13. The invention defined in claim 9, wherein said first drag means comprises a parachute having a canopy and shroud lines, said shroud lines being connected with said extension of said pick-up loop, and wherein said capstan means further includes selective drag control means for said first drag means comprising a control line connected at one end with the apex of said canopy and differential pay-out means on said capstan means, said control line being wound thereon at the other end thereof, whereby said canopy can be selectively spilled to vary the drag exerted by said first drag means.

14. The invention defined in claim 9, wherein said first pick-up means further includes a one-way brake means intermediate said pick-up loop and said capstan means.

15. The invention defined in claim 9, wherein said pick-up loop further includes line guide means for said pilot line and a first coupling means on said line guide means, and wherein said second pick-up means further includes a second coupling means interconnecting said pilot line and said pick-up line adapted to interconnect with said first coupling means when said pick-up line has been accelerated into juxtaposition with said line guide means by said pilot line.

16. The invention defined in claim 15, wherein said line guide means comprises a V-shaped tubular member integral with said pick-up loop and adapted to receive said pilot line within the apex thereof; wherein said first coupling means comprises an integral extension of the apex of said V-shaped member having one-way engaging means thereon; and wherein said second coupling means includes an in-line coupling element at the juncture of said pilot line and said pick-up line adapted to interlock with said one-way engaging means.

17. In an aerial pick-up system comprising an aircraft, a surface station and a cargo at said surface station including a pick-up line adapted to be engaged with means on said aircraft and constrained in tow behind said aircraft, means on said aircraft for bringing said in tow cargo into juxtaposition with said aircraft comprising a pick-up loop interconnected with said pick-up line, capstan means, and drag means, said loop including an integral extension reeved on said capstan means and connected with said drag means.

18. The invention defined in claim 17, wherein said capstan means further includes drag control means for selectively regulating the drag of said drag means.

19. The invention defined in claim 17, wherein said first drag means comprises a parachute having a canopy and shroud lines, said shroud lines being connected with said extension of said pick-up loop, and wherein said capstan means further includes selective drag control means for said first drag means comprising a control line connected at one end with the apex of said canopy and differential pay-out means on said capstan means, said control line being wound thereon at the other end thereof, whereby said canopy can be selectively spilled to vary the drag exerted by said first drag means.

20. In an aerial pick-up system including an aircraft, pick-up means on said aircraft, a surface station, an airborne target means tethered to said surface station, a cargo at said surface station to be picked up by said aircraft, a pick-up line connected to said cargo, a pilot line connected with said pickup line, and a drag means interconnecting said pilot line and said airborne target means, said pilot line being tethered to said surface station to constrain said target means and said drag means thereabove, the method of picking up said cargo with said aircraft comprising the steps of flying said aircraft directly into said target means and rupturing said target means, engaging said pilot line with said pick-up means at a point below said drag means to thereby reeve said pilot line around said pick-up means, accelerating said pick-up line toward said aircraft with said pilot line by the kinetic energy derived from said aircraft by said drag means, securing said pick-up line to said pick-up means, rupturing said pilot line to thereby release said drag means and subsequently accelerating said cargo toward said aircraft by said pick-up line.

21. In an aerial pick-up system including an aircraft, pick-up means on said aircraft including a pick-up loop, capstan means and first drag means, said loop including an integral extension reeved on said capstan means and connected with said first drag means, a surface station, an airborne target means tethered to said surface station, a cargo at said surface station to be picked up and delivered to said aircraft, a pick-up line connected to said cargo, a pilot line connected with said pick-up line, and a second drag means interconnecting said pilot line and said airborne target means, said pilot line being tethered to said surface station to constrain said target means and said drag means thereabove, the method of picking up and delivering said cargo to said aircraft comprising the steps of flying said aircraft directly into said target means and rupturing said target means, engaging said pilot line with said pick-up means at a point below said second drag means to thereby reeve said pilot line around said pick-up means, accelerating said pick-up line toward said aircraft with said pilot line by the kinetic energy derived from said aircraft by said second drag means, securing said pick-up line to said pick-up means, rupturing said pilot line to thereby release said second drag means and subsequently releasing said first drag means whereby torque is applied to said capstan means and paying out said first drag means to cause said pick-up loop and said pick-up line to reeve around said capstan means and accelerate said cargo into juxtaposition with said aircraft.

22. An aerial pick-up system comprising an aircraft, a surface station, a cargo at said surface station to be picked up and delivered to said aircraft while said aircraft is maintaining normal altitude and air speed, first pick-up means on said aircraft including a dependent pick-up loop, capstan means and first drag means, said pick-up loop including an integral extension reeved around said capstan means and connected with said first drag means; and second pick-up means at said surface station comprising an airborne target means tethered to said surface station, a pick-up line connected with said cargo, a pilot line connected with said pick-up line and second drag means interconnecting said pilot line and said target means, said pilot line being tethered to said surface station to constrain said target means and said drag means thereabove and being adapted to be engaged by said pick-up loop adjacent said second drag means, and third drag means connected with said pick-up line at a point adjacent said cargo.

23. The invention defined in claim 22, wherein said first, second and third drag means comprise first, second and third parachute means, respectively, said first drag means being of sufficient size to accelerate said pick-up line and said cargo toward said aircraft, said second drag means being of sufficient size to accelerate said pick-up line and said pilot line toward said aircraft and said third drag means being of sufficient size to augment the lift imparted to said cargo by said pick-up line when acting in opposition to said first drag means.

24. Means for accelerating an initially fixed surface body to a moving airborne body utilizing the kinetic energy of said airborne body comprising tow means connected with said surface body of sufficient strength and weight to withstand acceleration loads on said surface body, airborne pilot means connected with said tow means and extending into the path of said airborne body and being of sufficient strength and weight to withstand acceleration loads on said tow means, said pilot means including first drag means integral therewith adjacent said airborne body, means on said airborne body adapted to engage said pilot means adjacent to said drag means and second drag means on said tow means adjacent said surface body for augmenting the lift imparted thereto by said tow means.

25. In an aerial pick-up system including an aircraft, pick-up means on said aircraft, a surface station and a cargo at said surface station to be picked up by said aircraft, the combination at said surface station of an airborne target means, first drag means suspended below said target means, a pilot line tethering said drag means and target means to said surface station, and a pick-up line interconnecting said pilot line and said cargo, said pilot line and said drag means cooperating with said pick-up means to accelerate said pick-up line toward said aircraft and second drag means connected with said pick-up line at a point adjacent said cargo.

26. In an aerial pick-up system comprising an aircraft, a surface station and a cargo at said surface station including a pick-up line adapted to be engaged with means on said aircraft and constrained in tow behind said aircraft, means on said aircraft for bringing said in tow cargo into juxtaposition with said aircraft and absorbing the energy of inertia of said cargo comprising a pick-up loop interconnected with said pick-up line, capstan means, drag means adapted to trail behind said aircraft, a tow line on said drag means reeved on said capstan means, integral first retaining means on said aircraft and second retaining means on said tow line releasably engaged with said first retaining means and adapted to be disengaged therefrom by the inertia of said cargo, said loop being interconnected with said second retaining means.

27. The invention defined in claim 26, wherein said capstan means further includes drag control means for selectively regulating the drag of said drag means.

28. The invention defined in claim 26, wherein said first drag means comprises a parachute having a canopy and shroud lines, said shroud lines being connected with said extension of said pick-up loop, and wherein said capstan means further includes selective drag control means for said first drag means comprising a control line connected at one end with the apex of said canopy and differential pay-out means on said capstan means, said control line being wound thereon at the other end thereof, whereby said canopy can be selectively spilled to vary the drag exerted by said first drag means.

29. An aerial pick-up system comprising an aircraft, a surface station, a cargo at said surface station to be picked up and delivered to said aircraft while said aircraft is maintaining normal altitude and air speed, first pick-up means on said aircraft including a dependent pick-up loop, capstan means, first drag means adapted to trail behind said aircraft, a tow line on said drag means reeved on said capstan means, integral first retaining means on said aircraft and second retaining means on said tow line releasably engaged with said first retaining means and adapted to be disengaged therefrom by the inertia of said cargo, said loop being interconnected with said second retaining means; and second pick-up means at said surface station comprising an airborne target means tethered to said surface station, a pick-up line connected with said cargo, a pilot line connected with said pick-up line and second drag means interconnecting said pilot line and said target means, said pilot line being tethered to said surface station to constrain said target means and said drag means thereabove and being adapted to be engaged by said pick-up loop adjacent said second drag means.

30. The invention defined in claim 29, wherein said first and second drag means comprise first and second parachute means, respectively, said first drag means being of sufficient size to accelerate said pick-up line and said cargo toward said aircraft and said second drag means being of sufficient size to accelerate said pick-up line and said pilot line toward said aircraft.

31. The invention defined in claim 29, wherein said pilot line is of substantially lesser strength and weight than said pick-up line and wherein both said pilot line and said pick-up line are composed of resilient synthetic fibers.

32. The invention defined in claim 29, wherein said capstan means further includes selective drag control means for said first drag means.

33. The invention defined in claim 29, wherein said first drag means comprises a parachute having a canopy and shroud lines, said shroud lines being connected with said extension of said pick-up loop, and wherein said capstan means further includes selective drag control means for said first drag means comprising a control line connected at one end with the apex of said canopy and differential pay-out means on said capstan means, said control line being wound thereon at the other end thereof, whereby said canopy can be selectively spilled to vary the drag exerted by said first drag means.

34. The invention defined in claim 29, wherein said first pick-up means further includes a one-way brake means intermediate said pick-up loop and said capstan means.

35. The invention defined in claim 29, wherein said pick-up loop further includes line guide means for said pilot line and a first coupling means on said line guide means, and wherein said second pick-up means further includes a second coupling means interconnecting said pilot line and said pick-up line adapted to interconnect with said first coupling means when said pick-up line has been accelerated into juxtaposition with said line guide means by said pilot line.

36. The invention defined in claim 35, wherein said line guide means comprises a V-shaped tubular member integral with said pick-up loop and adapted to receive said pilot line within the apex thereof; wherein said first coupling means comprises an integral extension of the apex of said V-shaped member having one-way engaging means thereon; and wherein said second coupling means includes an in-line coupling element at the juncture of said pilot line and said pick-up line adapted to interlock with said one-way engaging means.

37. In an aerial pick-up system including an aircraft, pick-up means on said aircraft including energy absorbing means, a surface station, an airborne target means tethered to said surface station, a cargo at said surface station to be picked up by said aircraft, a pick-up line connected to said cargo, a pilot line connected with said pick-up line, and a drag means interconnecting said pilot line and said airborne target means, said pilot line being tethered to said surface station to constrain said target means and said drag means thereabove, the method of picking up said cargo with said aircraft comprising the steps of flying said aircraft directly into said target means and rupturing said target means, engaging said pilot line with said pick-up means at a point below said drag means to thereby reeve said pilot line around said pick-up means, accelerating said pick-up line toward said aircraft with said pilot line by the kinetic energy derived from said aircraft by said drag means, securing said pick-up line to said pick-up means, rupturing said pilot line to thereby release said drag means, absorbing the energy of inertia of said cargo with said energy absorbing means and subsequently accelerating said cargo toward said aircraft by said pick-up line.

38. In an aerial pick-up system including an aircraft, pick-up means on said aircraft including a pick-up loop, capstan means and first drag means, said loop including an integral extension reeved on said capstan means and connected with said first drag means, a surface station, an airborne target means tethered to said surface station, a cargo at said surface station to be picked up and delivered to said aircraft, a pick-up line connected to said cargo, a pilot line connected with said pick-up line, and a second drag means interconnecting said pilot line and said airborne target means, said pilot line being tethered to said surface station to constrain said target means and said drag means thereabove, the method of picking up and delivering said cargo to said aircraft comprising the steps of trailing said first drag means behind said aircraft, flying said aircraft directly into said target means and rupturing said target means, engaging said pilot line with said pick-up means at a point below said second drag means to thereby reeve said pilot line around said pick-up means, accelerating said pick-up line toward said aircraft with said pilot line by the kinetic energy derived from said aircraft by said second drag means, securing said pick-up line to said pick-up means, rupturing said pilot line to thereby release said second drag means, absorbing the energy of inertia of said cargo with said first drag means and subsequently paying out said first drag means to cause said pick-up loop to reeve around said capstan means and accelerate said cargo into juxtaposition with said aircraft.

39. In a drag parachute system including a capstan, a drag line reeved on said capstan, and a parachute having a canopy and shroud lines connected with said drag line by said shroud lines, drag control means for said parachute comprising a control line connected at one end with the apex of said canopy and differential pay-out means on said capstan means, said control line being wound on said differential pay-out means at the other end thereof, whereby said canopy can be selectively spilled to vary the drag exerted by said parachute on said drag line.

References Cited by the Examiner

UNITED STATES PATENTS

| | | | |
|---|---|---|---|
| 1,812,955 | 7/31 | Horni | 258—1.2 |
| 2,334,979 | 11/43 | Adams | 258—1.6 |
| 2,410,451 | 11/46 | Landry | 258—1.6 |
| 2,467,112 | 4/49 | Cowgill | 258—1.6 |
| 2,505,707 | 4/50 | Dupont | 258—1.2 |

LOUIS J. DEMBO, *Primary Examiner.*